United States Patent
Yan (10) Patent No.: US 12,132,313 B2
(45) Date of Patent: Oct. 29, 2024

(54) HYBRID POWER GENERATION SYSTEM WITH POWER OUTPUT SMOOTHING OPERATION

(71) Applicant: General Electric Company, Schenectady, NY (US)

(72) Inventor: Min Yan, Niskayuna, NY (US)

(73) Assignee: GE Grid Solutions LLC, Atlanta, GA (US)

( * ) Notice: Subject to any disclaimer, the term of this patent is extended or adjusted under 35 U.S.C. 154(b) by 482 days.

(21) Appl. No.: 17/294,883

(22) PCT Filed: Jan. 31, 2020

(86) PCT No.: PCT/US2020/016051
§ 371 (c)(1),
(2) Date: May 18, 2021

(87) PCT Pub. No.: WO2020/160372
PCT Pub. Date: Aug. 6, 2020

(65) Prior Publication Data
US 2021/0408794 A1 Dec. 30, 2021

Related U.S. Application Data

(60) Provisional application No. 62/799,114, filed on Jan. 31, 2019.

(51) Int. Cl.
*H02J 3/32* (2006.01)
*G05B 19/042* (2006.01)
(52) U.S. Cl.
CPC .............. *H02J 3/32* (2013.01); *G05B 19/042* (2013.01); *G05B 2219/2639* (2013.01)
(58) Field of Classification Search
None
See application file for complete search history.

(56) References Cited

U.S. PATENT DOCUMENTS

| | | | |
|---|---|---|---|
| 9,489,701 B2 | 11/2016 | Emadi et al. | |
| 10,181,737 B2 | 1/2019 | Sakuma et al. | |

(Continued)

FOREIGN PATENT DOCUMENTS

| | | | |
|---|---|---|---|
| CN | 105634016 A | 6/2016 | |
| CN | 108390418 A | 8/2018 | |

(Continued)

OTHER PUBLICATIONS

Das et al.: "GA based frequency controller for solar thermal-diesel-wind hybrid energy generation/energy storage system", International Journal of Electrical Power & Energy Systems, Dec. 2012, vol. 43 Issue: 1 pp. 262-279.

(Continued)

*Primary Examiner* — Jennifer L Norton
(74) *Attorney, Agent, or Firm* — Armstrong Teasdale LLP (57) ABSTRACT

According to some embodiments, system and method are provided comprising calculating an output power setpoint for a thermal generation system for a first calculation cycle of a time window having at least one calculation cycle; calculating a net demand for dispatchable power to satisfy a required load demand after calculating an available renewable power generation; determining, responsive to determining that the net demand for dispatchable power exceeds the output power setpoint for the thermal generation system, whether a discharge power of an energy storage device satisfies a power gap; generating, responsive to determining that the discharge power is not larger than a power rating, a discharge command to discharge the energy storage device at the discharge power; and increasing, responsive to determining that the discharge of the energy storage device fails to satisfy the power gap, the output power setpoint for the thermal generation system for the first calculation cycle.

20 Claims, 7 Drawing Sheets

(56) References Cited

U.S. PATENT DOCUMENTS

| | | | |
|---|---|---|---|
| 2008/0197709 A1* | 8/2008 | Wakitani | H02J 3/38 307/84 |
| 2009/0076661 A1* | 3/2009 | Pearson | H01M 16/006 307/46 |
| 2010/0181837 A1* | 7/2010 | Seeker | H02J 1/102 307/72 |
| 2011/0208370 A1* | 8/2011 | Lee | G06F 1/30 700/297 |
| 2012/0133333 A1 | 5/2012 | Morioka et al. | |
| 2013/0041516 A1* | 2/2013 | Rockenfeller | H02J 3/38 700/287 |
| 2014/0200723 A1* | 7/2014 | Roy | H02J 3/46 700/291 |
| 2015/0107251 A1* | 4/2015 | Buggert | F22B 1/006 60/676 |
| 2016/0072291 A1* | 3/2016 | Goldman | H02J 3/381 700/295 |
| 2017/0288455 A1 | 10/2017 | Fife | |
| 2018/0131224 A1* | 5/2018 | Foggia | H02J 7/24 |
| 2019/0074693 A1* | 3/2019 | Kudo | H02J 3/003 |
| 2022/0077707 A1* | 3/2022 | Yan | H02J 7/0048 |
| 2024/0053715 A1* | 2/2024 | Elbsat | H02J 3/32 |

FOREIGN PATENT DOCUMENTS

| | | | |
|---|---|---|---|
| KR | 10-2013-0022039 A | 3/2013 | |
| KR | 10-2016-0114802 A | 10/2016 | |
| WO | WO-2009156261 A2 * | 12/2009 | H02J 3/32 |
| WO | 2016027379 A1 | 2/2016 | |
| WO | 2018029722 A1 | 2/2018 | |

OTHER PUBLICATIONS

International Search Report and Written Opinion dated May 27, 2020 which was issued in connection with a counterpart PCT Application No. PCT/US2020/016051 which was filed on Jan. 31, 2020.

* cited by examiner

HYBRID POWER GENERATION SYSTEM WITH POWER OUTPUT SMOOTHING OPERATION

CROSS-REFERENCE TO RELATED APPLICATION

This application claims the benefit of U.S. Provisional Patent Application No. 62/799,114, filed on Jan. 31, 2019 and International PCT Application No. PCT/US2020/016051, filed on Jan. 31, 2020, the contents of which are hereby incorporated by reference for all purposes.

BACKGROUND

This invention relates generally to controlling energy outputted from a hybrid power generation system and, more specifically, to smoothing power outputted by a thermal power generation asset of the hybrid power generation system.

The worldwide demand for electrical energy has been increasing year by year. Most of the electrical energy demand is met by energy produced from thermal power generation energy sources such as coal, oil and gas. However, in recent years, with the rising global climate change issues, there has been a push for electricity generation by renewable energy resources such as solar power and wind power.

Wind turbine generators are regarded as environmentally friendly and relatively inexpensive alternative sources of energy that utilize wind energy to produce electrical power. Further, solar power generation uses photovoltaic (PV) modules to generate electricity from sunlight. Since the intensity of wind and sunlight is not constant, the power output of wind turbines and PV modules fluctuates throughout the day. Unfortunately, the demand for electricity does not vary in accordance with solar and wind variations. To supply the demand for electricity during times when there is insufficient supply of renewable power, thermal power generation systems continue to be used.

Thermal power generation assets, such as steam turbines, gas turbines, gas engines, and diesel engines, have varying performance characteristics when responding to changes in load demand. A thermal power generation asset needs time, typically between minutes to tens of minutes, to respond to the requirement of changing its power output level. This lag response time is slower than the speed of load demand changes on a utility grid. Frequent changes in power output levels of a thermal power generation asset will add power generation inefficiencies of the asset, more wear and tear to the asset, and higher maintenance cost.

Energy storage devices may help to address the issues of variability of solar and wind power systems and the inefficiency of thermal power generation systems in responding to variations in load demand. Therefore, a system and a method that will address the foregoing issues is desirable.

BRIEF DESCRIPTION

In some embodiments, an energy storage device and associated power controller are added to a hybrid microgrid system to assist in the power operation of thermal power generation (TPG) systems.

BRIEF DESCRIPTION OF THE DRAWINGS

These and other features and aspects of embodiments of the present invention will become better understood when the following detailed description is read with reference to the accompanying drawings in which like characters represent like parts throughout the drawings, wherein.

DETAILED DESCRIPTION

A microgrid is a group of interconnected loads and distributed alternating current (AC) and/or direct current (DC) generation sources within a clearly defined electrical boundary that acts as a single controllable entity. Hybrid microgrid systems are a type of microgrid that includes renewable energy sources, such as wind turbine and photovoltaic (PV) power generation systems. The integration of renewable technologies reduces operating expenses when compared to purely conventional generation, which depends on thermal power generation (TPG) systems, such as coal-fired, liquified natural gas (LNG)-fired, and oil-fired thermal power generation sources.

In particular, LNG-fired and oil-fired thermal power generation sources are adjustable in their power generation setpoints, which provides the flexibility of ramping up or down their output power depending upon the varying load demands of the hybrid microgrid over a time period. From a system efficiency perspective, TPG sources operate at greatest efficiency when their power setpoint is adjusted to maximum output power. From a system reliability perspective, TPG sources operate at greatest reliability when there are minimal adjustments to their power setpoint, which results in lesser wear and tear of the thermal power generation system. These cost, efficiency, and reliability considerations can be further explained with reference to FIGS. 1A and 1B.

Figure 1A:
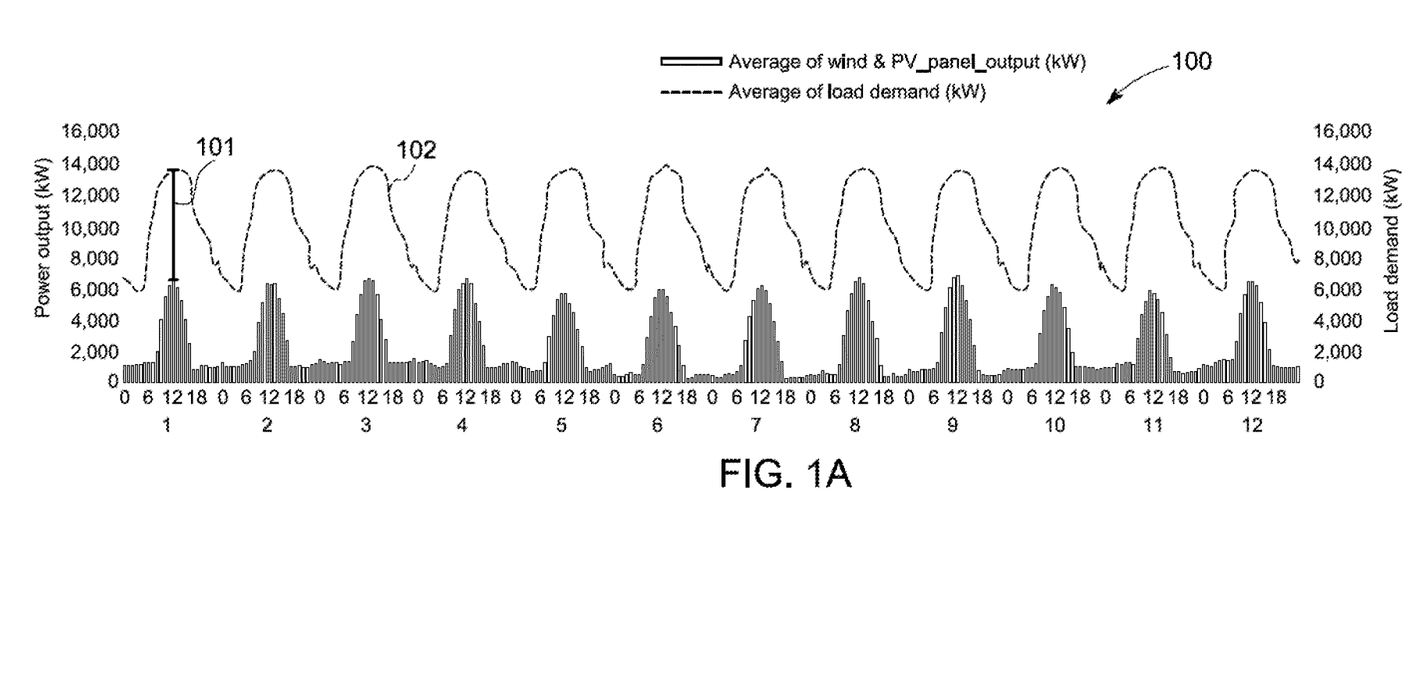
FIG. 1A depicts a bar graph representing a power gap when comparing variable renewable power versus load demand without factoring dispatchable energy sources during a calculation cycle in accordance with an illustrative embodiment.

FIG. 1A shows a histogram representing an average hourly power output (in kW) of all combined variable renewable power sources 102 (e.g., 8.8 MWdc PV and 5.0 MWac Wind) versus an average hourly load demand (in kW; represented by dotted graph curve 102) for each month of a 12-month (equivalent to 8760-hour) time period, as shown in one example aspect of the present disclosure. For example, at month 1, at 12 noon, the average hourly power output of all combined variable renewable power sources is at its highest output value (approximately 6500 kW), while the average hourly load demand of the microgrid is also at its highest demand value (approximately 13500 kW or 13.5 MW). To make up for the power demand gap (13500-6500=7000 kW), a thermal power generation system would be required. Given the load demand requirements during the peak hour is 13.5 MW (13500 kW), this example requires the operation of two gas engines at the peak hour, since this example would employ gas engines that each deliver a maximum power output of 9.35 MW (equivalent to 9350 kW).

Figure 1B:
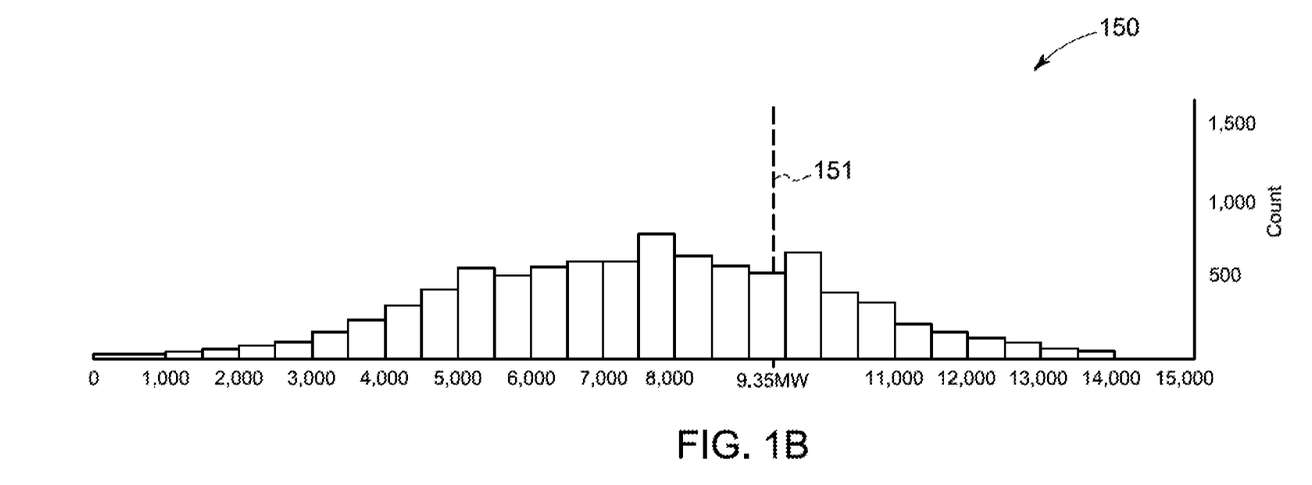
FIG. 1B depicts a histogram representing an hourly power gap of FIG. 1A that a thermal power generation (TPG) system would need to make up without a supplemental energy storage system in accordance with an illustrative embodiment.

FIG. 1B shows a histogram representing an hourly power gap 101 (as identified in the example shown in FIG. 1A) that one or more gas turbines would have to make up over a 12-month (equivalent to 8760-hour) time period, as shown in one example aspect of the present disclosure. The vertical dotted line 151 represents the maximum output power (9.35 MW) that the example single gas engine can deliver. Thus, the bars to the right of the dotted line represent the amount of hours in which two gas engines are used to deliver the necessary power to make up for the power gap illustrated in FIG. 1A over the 1-year period. In this example, approximately 2099 hours (or 24%) out of the year had a power gap of greater than 9.35 MW and thus required the operation of two gas engines. In addition, the histogram 150 shows a large fluctuation of power outputs delivered by the gas engine over the year period, with a predominantly even distribution of operation hours between 5 MW and 10 MW. This is indicative of an inefficiency in the operation of the gas engines, when considering that the example gas engine operates at maximum efficiency when running at maximum power. Such inefficiency translates into greater costs in energy production. Moreover, the numerous fluctuations in the output power setpoints of the example gas engine(s) result in greater wear and tear of the engine(s), which leads to greater repair costs and a shorter engine lifespan.

To reduce the abovementioned costs due to operational inefficiency of a TPG system, an energy storage system (also referred to as a battery energy storage system (BESS)) and hybrid AC-DC power controller is added to the hybrid power microgrid system. The energy storage system serves to supplement the TPG system's power gap requirement. By providing supplemental power to the microgrid during high peak load demand, the energy storage system reduces the TPG system's need to ramp up its power output. Conversely, during times of low load demand (e.g., net surplus of power), the TPG system would not have to ramp down its power input energy storage system, since an added energy storage system would store the extra power generated by the TPG system. Thus, the energy storage system allows a more steady-state output power setpoint of the TPG system. The hybrid AC-DC power controller works in coordination with the various renewable power generation sources, the TPG system, and the energy storage system to control the power levels of the dispatchable sources of power. This includes control of the TPG system output setpoint level and the state of charge or discharge of the energy storage system, in view of the load demand for the time period observed.

Figure 2:
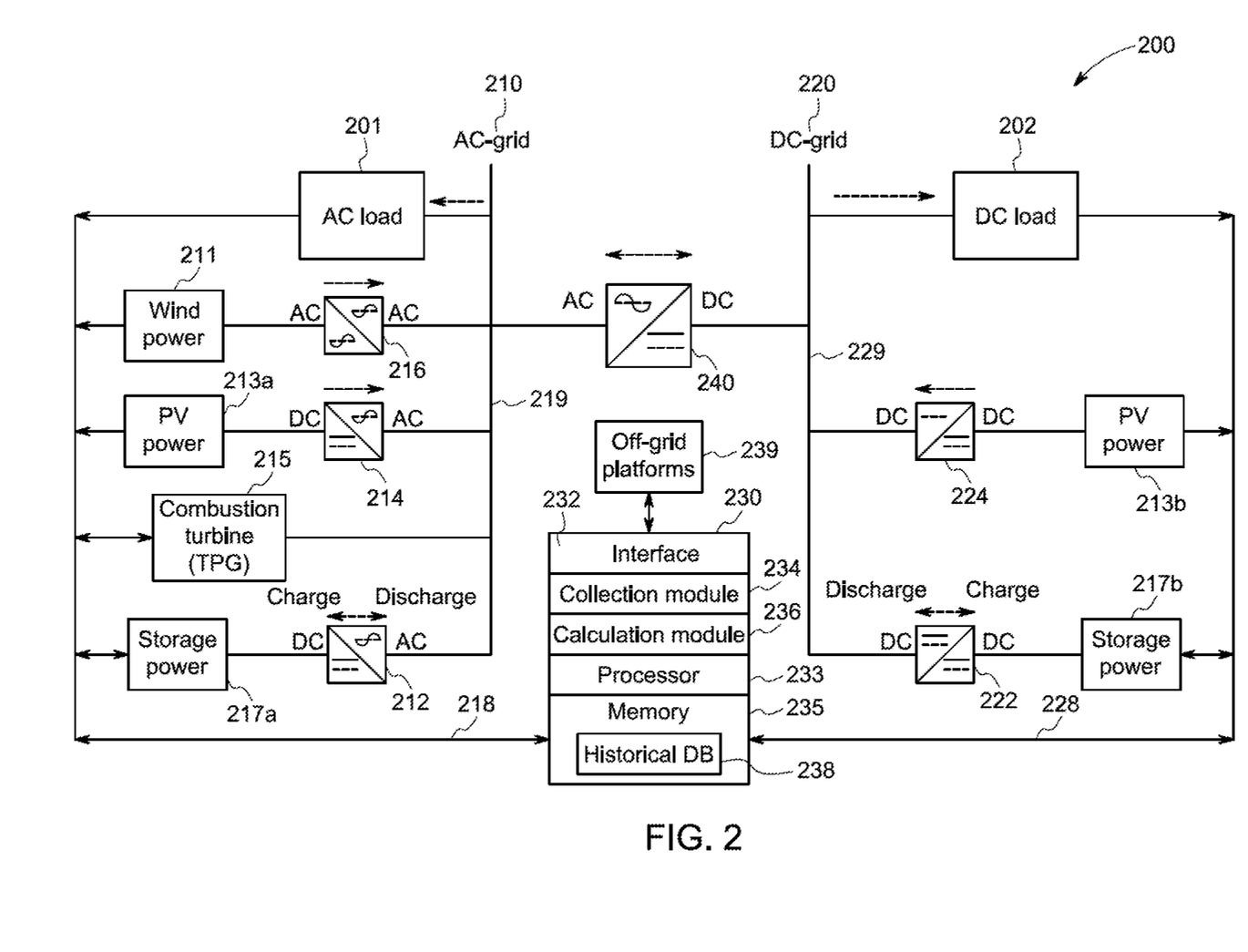
FIG. 2 depicts a schematic diagram representing an AC-DC composite hybrid power microgrid system including an energy storage system and hybrid AC-DC power controller in accordance with an illustrative embodiment.

FIG. 2 shows an AC/DC composite hybrid power microgrid system 200 according to aspects of the present disclosure. The hybrid power microgrid system 200 includes an AC microgrid 210 and a DC microgrid 220. The microgrid system 200 includes a bi-directional power converter 240 between an AC microgrid 210 and a DC microgrid 220 for AC/DC or DC/AC power conversion. The AC microgrid 210 uses power converters 212, 214, and 216 of AC/AC or DC/AC conversion structure. The DC microgrid 220 uses power converters 222 and 224 of a DC/DC conversion structure.

The AC microgrid 210 includes a wind power generation system 211, photovoltaic (PV) power generation system 213a, combustion turbine power generation system 215, and a battery energy storage system 217a. Systems 211, 213a, 215, and 217a are connected to each other and to an AC load 201 via an AC grid bus 219. AC load 201 and systems 211, 213a, 215, and 217a are communicatively connected to hybrid AC-DC power controller 230 via AC control bus 218. The DC microgrid 220 includes a PV power generation system 213b and a battery energy storage system 217b. Systems 213b and 217b are connected to each other and to a DC load 202 via a DC grid bus 229. DC load 202 and systems 213b and 217b are communicatively connected to hybrid AC-DC power controller 230 via AC control bus 228.

Figure 3A:
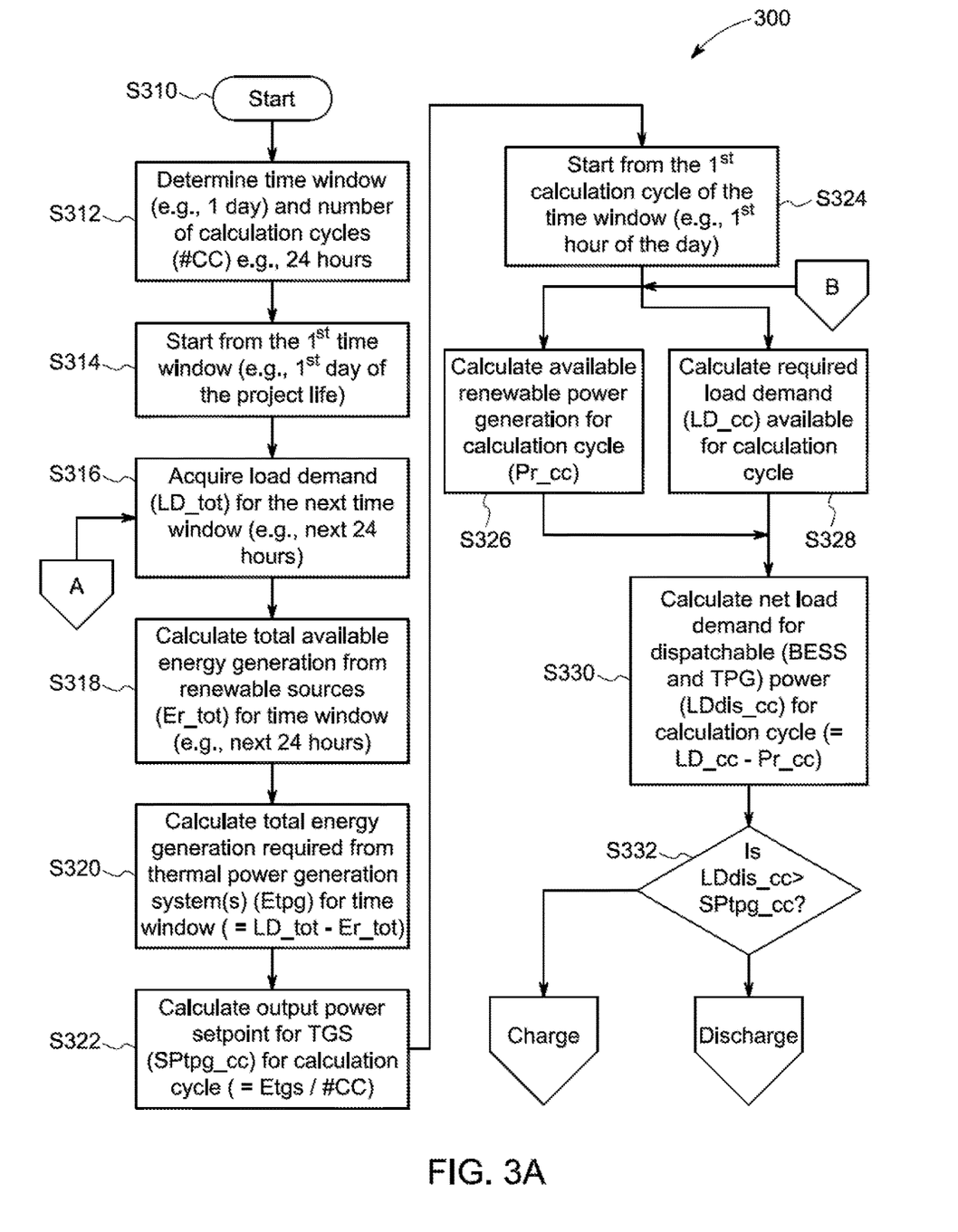
FIGS. 3A-3C each depict portions of a flowchart of a process for hybrid power control, in accordance with an illustrative embodiment.
Figure 3B:
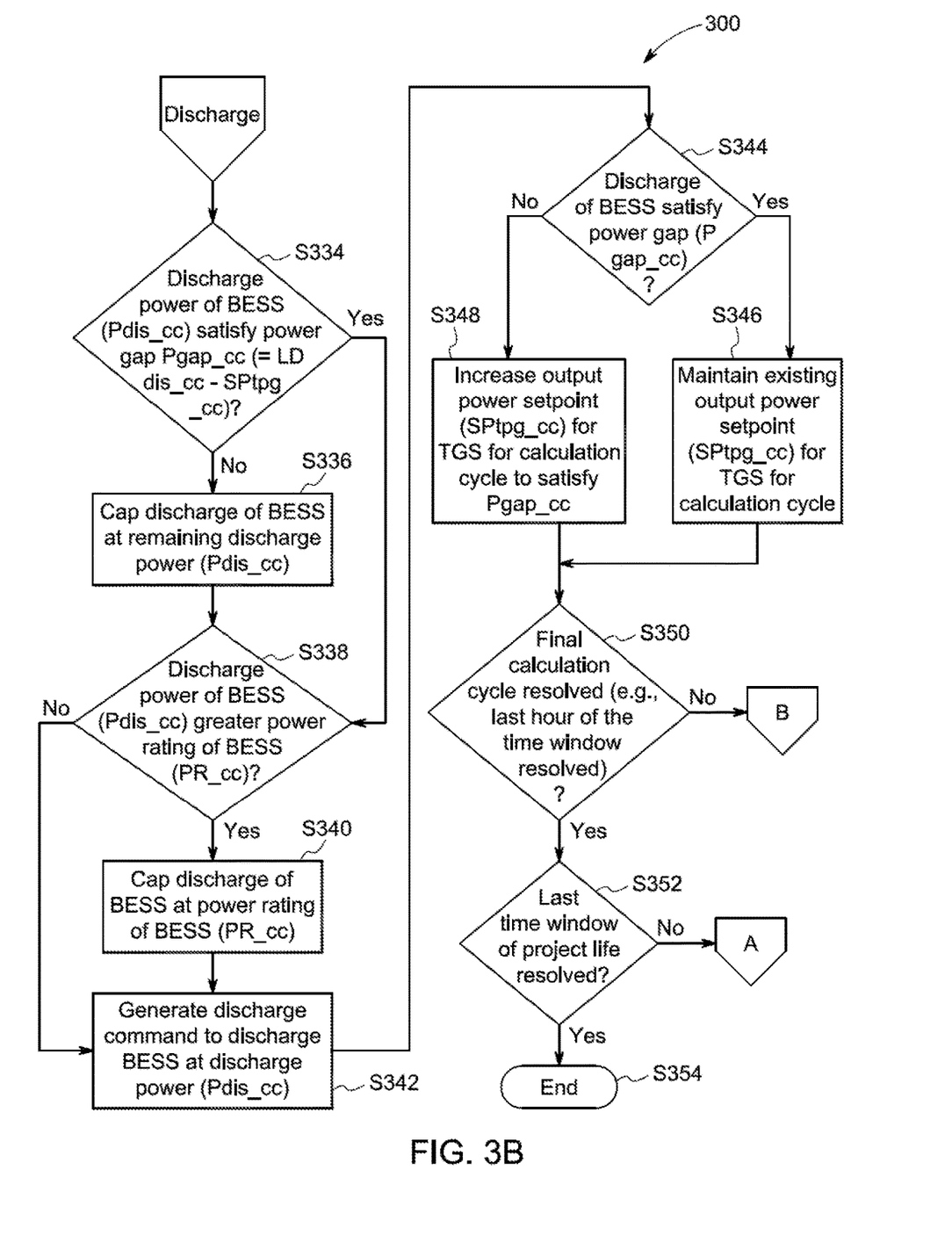
Figure 3C:
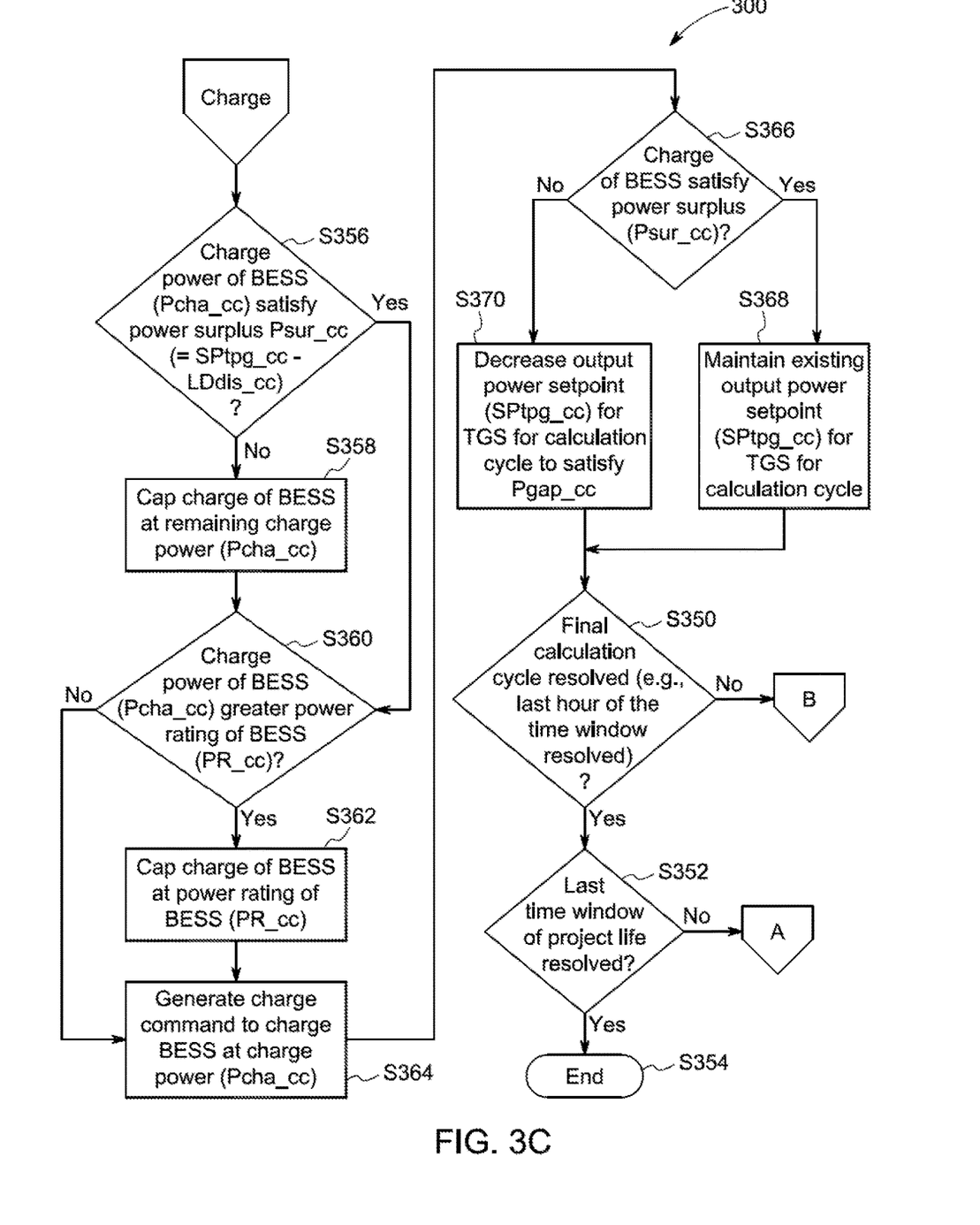

Turning to FIGS. 3A-C, a flow diagram 300 of examples of operation of the hybrid AC-DC power controller 230 of hybrid power microgrid system 200 shown in FIG. 2, according to some embodiments are provided. In particular, FIGS. 3A-C provides a flow diagram of a process 300, according to some embodiments. Process 300 and other processes described herein may be performed using any suitable combination of hardware (e.g., circuit(s), software or manual means. In one or more embodiments, the controller 230 is conditioned to perform the process 300 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

In one or more embodiments, the controller 230 includes a collection module 234 for acquiring historical, present, and forecast data from external data sources and a calculation module 236 for determining the power levels of the dispatchable sources of power. Calculation module 236 also controls the TPG system output setpoint level and the state of charge or discharge of the energy storage system, in view of the load demand for the time period observed. In one or more embodiments, the controller 230 includes one or more processor elements 233 and a memory 235 that stores a historical database 238. According to one or more embodiments, the processor 233 is a conventional microprocessor, and operates to control the overall functioning of the collection module 234 and calculation module 236. In one or more embodiments, the controller 230 includes a communication interface 232 for allowing the processor 233, and hence the collection module 234 and calculation module 236, to engage in communication over data networks (not shown) with other devices (e.g., energy storage devices 217a, 217b, TPG devices 215, renewable power generation devices 211, 213a, 213b, and load entities at AC load 201 and/or DC load 202) or other off-grid platforms and devices 239.

In one or more embodiments, the one or more memory 235 and data storage devices (e.g., database 238) comprise any combination of one or more of a hard disk drive, RAM (random access memory), ROM (read only memory), flash memory, etc. The memory 235/data storage devices 238 store software that programs the processor 233 and the modules 234, 236 to perform functionality as described herein. According to other embodiments, other types of storage devices include magnetic storage device, optical storage devices, mobile telephones, and/or semiconductor memory devices. The memory 235 stores a program or logic (not shown) for controlling the processor 233. The processor 233 performs instructions of the program logic, and thereby operates in accordance with any of the embodiments described herein. Furthermore, other embodiments include program logic that is stored in a compressed, uncompiled and/or encrypted format. The program logic includes other program elements, such as an OS (operating system), a database management system, and/or device drivers used by the processor 233 to interface with devices external to the controller 230.

According to one or more embodiments, a user/operator accesses the system 200 via one of the platforms 239 (a control system, a desktop computer, a laptop computer, a personal digital assistant, a tablet, a smartphone, etc.) to view information and/or manage the dispatchable sources of power in accordance with any of the embodiments described herein. Moreover, the embodiments described herein are implemented using any number of different hardware configurations. For example, controller 230 and platforms 239 further include an input device (not shown) (e.g., a mouse and/or keyboard to enter information about the time and power measurements and settings) and an output device (not shown) (e.g., to output and display the data and/or recommendations).

Initially, the process 300 starts at S310 and proceeds to S312, in which hybrid AC-DC power controller 230 is configured with a project life having at least one time window having at least one calculation cycle during which to collect energy supply data and load demand data for determining an output power setpoint for at least one TPG system as well as determining charging or discharging power levels of an energy storage system, such as a BESS. According to one embodiment, the parameter values of the project life, time window, and calculation cycles are programmed by an administrator of the microgrid system 200 via an interface 232 with controller 230. The energy storage device includes two or more energy storage elements 217a, 217b. In one or more embodiments, the energy storage devices 217a, 217b are a battery, or any other suitable energy storage device. In one or more embodiments, the energy storage devices 217a, 217b are devices at a power plant, standalone energy storage devices, or any combination therein. The energy storage devices 217a, 217b provide energy to satisfy a power load demand from at least one of a grid, customers, etc.

Starting from a first, time window, e.g., the first day of a project life as shown in S314, the process continues to S316, where calculation module 236 determines a load demand for the next time period. In this example embodiment, since the process is beginning, the next time period consists of the first 24 hours. Subsequent iterations of this step would use the data pertaining to the subsequent 24-hour time window. In one embodiment, the load demand is acquired from historical load demand data in historical database 238, predicted load demand data based on future load demands of AC Load 201 and DC Load 202 acquired by collection module 234, and any combination therein. It should be noted that while the example hybrid power microgrid system 200 includes both AC and DC loads, it should be appreciated that in other embodiments, load demand data is drawn from either an AC Load or a DC Load if the microgrid were limited to either AC power grid 210 or DC power grid 220.

The process continues to S318, in which calculation module 236 calculates a total available energy generation for the time window from at least one renewable power generation system, which includes but is not limited to PV 213a, 213b, wind 211, any other type of renewable power source (not shown), and any combination therein. It should be noted that while the example hybrid power microgrid system 200 includes renewable power sources at both AC grid 210 and DC grid 220, it should be appreciated that in other embodiments, total available energy generation from renewable power generations systems are limited to either an AC power grid 210 or DC power grid 220. The calculation of total available energy generation from renewable power generation systems is drawn from historical renewable power source generation data for the time window being calculated that is stored in historical database 238, predicted renewable power source generation data for the time window being calculated (e.g., weather forecast data for renewable power generation system's location) that is acquired by collection module 234, or any combination therein.

The process continues to S320, in which calculation module 236 calculates a total energy generation required from at least one thermal power generation (TPG) system 215 for the time window by calculating a difference between the load demand from the time window and the total available energy generation from renewable power generation systems for the time window. Then at S322, calculation module 236 calculates an output power setpoint for the TPG system 215 for the time window by dividing the total energy generation required from at least one TPG system 215 by the number of calculation cycles in the time period being currently measured, e.g. 24.

Starting from the first calculation cycle (e.g., the first hour) of the time window being currently measured S324, the process continues to S326, which calculation module 236 calculates an available renewable power generation for the first calculation cycle. The calculation of available renewable power generation from renewable power generation systems 211, 213a, and 213b is drawn from historical renewable power source generation data for the time window being calculated that is stored in historical database 238, predicted renewable power source generation data for the time window being calculated (e.g., weather forecast data for renewable power generation system's location) that is acquired by collection module 234, or any combination thereof. From S324, the process also continues to S328, which calculation module 236 calculates a required load demand from AC load 201, DC load 202, or any combination thereof depending on what type(s) of loads are present.

From the calculations performed at S326 and S328, the process continues to S330, which calculation module 236 calculates a net load demand for dispatchable power (i.e., BESS in combination with TPG) for the calculation cycle being currently measured, by subtracting the calculated required load demand (from S328) from the available renewable power generation for the calculation cycle (S326). After calculating the net load demand for dispatchable power for the calculation cycle (S330), the process continues to decision block S332, where calculation module 234 determines whether the net load demand for dispatchable power is greater than the output power setpoint for the one or more TPG systems for the calculation cycle being currently measured.

If it is determined from S332 that the net load demand for dispatchable power is greater than the output power setpoint for the one or more TPG systems for the calculation cycle being currently measured, the process continues to a DISCHARGE off-page connector to the next portion of the flowchart shown in FIG. 3B. With reference now to FIG. 3B, the process continues to block S334, where calculation module 236 determines whether a discharge power of the energy storage system 217a, 217b (e.g., BESS) satisfies a power gap. As used herein, the power gap is defined as the difference between the net demand for dispatchable power (i.e., BESS+TPG) for the current calculation cycle and the output power setpoint for the TPG system 215, when the net demand value is larger than the output power setpoint of the TPG system. The determination at S334 is whether the BESS has sufficient power that can be discharged to satisfy the power gap calculated by calculation module 236. If it is determined that the BESS 217a, 217b fail to have sufficient power that can be discharged to meet the power gap for the calculation cycle, the process continues to S336, in which calculation module 236 caps the discharge of the BESS 217a, 217b at the remaining discharge power amount and then proceeds to decision block S338.

However, if it is determined that the BESS 217a, 217b does satisfy the power gap, the process continues to decision block S338, in which calculation module determines whether the discharge power of the BESS 217a, 217b is greater than the power rating of the BESS. As used herein, the power rating in the context of discharging a BESS refers to how much power the BESS can discharge within the calculation cycle currently being measured. If it is determined in S338 that the discharge power is larger than the power rating of the BESS, the process proceeds to S340, in which calculation module 236 caps the discharge of the BESS 217a, 217b at the BESS' power rating, since the BESS would be limited to the discharge power that can be outputted by the BESS for the calculation cycle. Alternatively, if it is determined in S338 that the discharge power is not larger than the power rating of the BESS, then the process continues to S342, in which calculation module 236 generates and communicates a discharge command to the BESS 217a, 217b to discharge the BESS at the discharge power for the current calculation cycle. In this regard, it should be noted that the amount of discharge power that is required to be discharged represents a total amount between the two BESS 217a and 217b if both AC grid 210 and DC grid 220 are being considered. According to other embodiments, the discharge command may be sent to only the BESS 117a or the BESS 117b and would represent the total discharge power amount.

From S342, the process continues to decision S344, in which calculation module 236 determines whether the actual discharge of the BESS 117a, 117b satisfies the power gap. If the BESS' discharge satisfies the power gap, calculation module 236 will maintain the existing output power setpoint for the TPG system 215 in S346 and continue to S350. However, if the BESS' discharge cannot satisfy the power gap, calculation module 236 generates and communicates a command to the TPG system 215 to increase the output power setpoint of the TPG system 215 in S348 and continue to S350.

Returning now to decision block S332, if it is determined from S332 that the net load demand for dispatchable power is not greater than the output power setpoint for the one or more TPG systems for the calculation cycle being currently measured, the process continues to a CHARGE off-page connector to the next portion of the flowchart shown in FIG. 3C. With reference now to FIG. 3C, the process continues to block S356, where calculation module 236 determines whether a charge power of the energy storage system 217a, 217b (e.g., BESS) satisfies a power surplus. As used herein, the power surplus is defined as the difference between the net demand for dispatchable power (i.e., BESS+TPG) for the current calculation cycle and the output power setpoint for the TPG system 215, when the output power setpoint of the TPG system is larger than the net demand value. The determination at S356 is whether the BESS has sufficient charging space that can be charged to satisfy the power surplus calculated by calculation module 236. If it is determined that the BESS 217a, 217b fail to have sufficient space that can be charged to meet the power surplus for the calculation cycle, the process continues to S358, in which calculation module 236 caps the charge of the BESS 217a, 217b at the remaining charge power amount and then proceeds to decision block S360.

However, if it is determined that the BESS 217a, 217b does satisfy the power surplus, the process continues to decision block S360, in which calculation module determines whether the charge power of the BESS 217a, 217b is greater than the power rating of the BESS. As used herein, the power rating in the context of charging a BESS refers to how much power the BESS can charge within the calculation cycle currently being measured. If it is determined in S360 that the charge power is larger than the power rating of the BESS, the process proceeds to S362, in which calculation module 236 caps the charge of the BESS 217a, 217b at the BESS' power rating, since the BESS would be limited to the charge power that can be stored by the BESS for the calculation cycle. Alternatively, if it is determined in S360 that the discharge power is not larger than the power rating of the BESS, then the process continues to S364, in which calculation module 236 generates and communicates a charge command to the BESS 217a, 217b to charge the BESS at the charge power for the current calculation cycle. In this regard, it should be noted that the amount of charge power that is required to be stored represents a total amount between the two BESS 217a and 217b if both AC grid 210 and DC grid 220 are being considered. According to other embodiments, the charge command may be sent to only the BESS 117a or the BESS 117b and would represent the total charge power amount.

From S364, the process continues to decision S366, in which calculation module 236 determines whether the actual charge of the BESS 117a, 117b satisfies the power surplus. If the BESS' charge satisfies the power surplus, calculation module 236 will maintain the existing output power setpoint for the TPG system 215 in S368 and continue to S350. However, if the BESS' charge cannot satisfy the power surplus, calculation module 236 generates and communicates a command to the TPG system 215 to decrease the output power setpoint of the TPG system 215 in S370 and continue to S350.

At decision block S350, calculation module 236 determines whether the currently resolved calculation cycle was the last cycle of the time window to be resolved by hybrid AC-DC power controller 230. If it is not the last cycle of the time window to be resolved, the process iteratively continues to off-page connector "B" of FIG. 3A, where the subsequent calculations pertain to the next, unresolved calculation cycle. If decision block S350 determines that the currently resolved calculation cycle is the last cycle of the time window to be resolved by hybrid AC-DC power controller 230, the process continues to decision block S352, which calculation module 236 determines whether the current time period to be resolved represents the final time window of the project life to be resolved. If the current time period to be resolved represents the final time window of the project life, the process ends at S354. Otherwise, the process iteratively continues to off-page connector "A" of FIG. 3A, where the process returns to S316 and acquires the load demand for the next unresolved time window.

Figure 4:
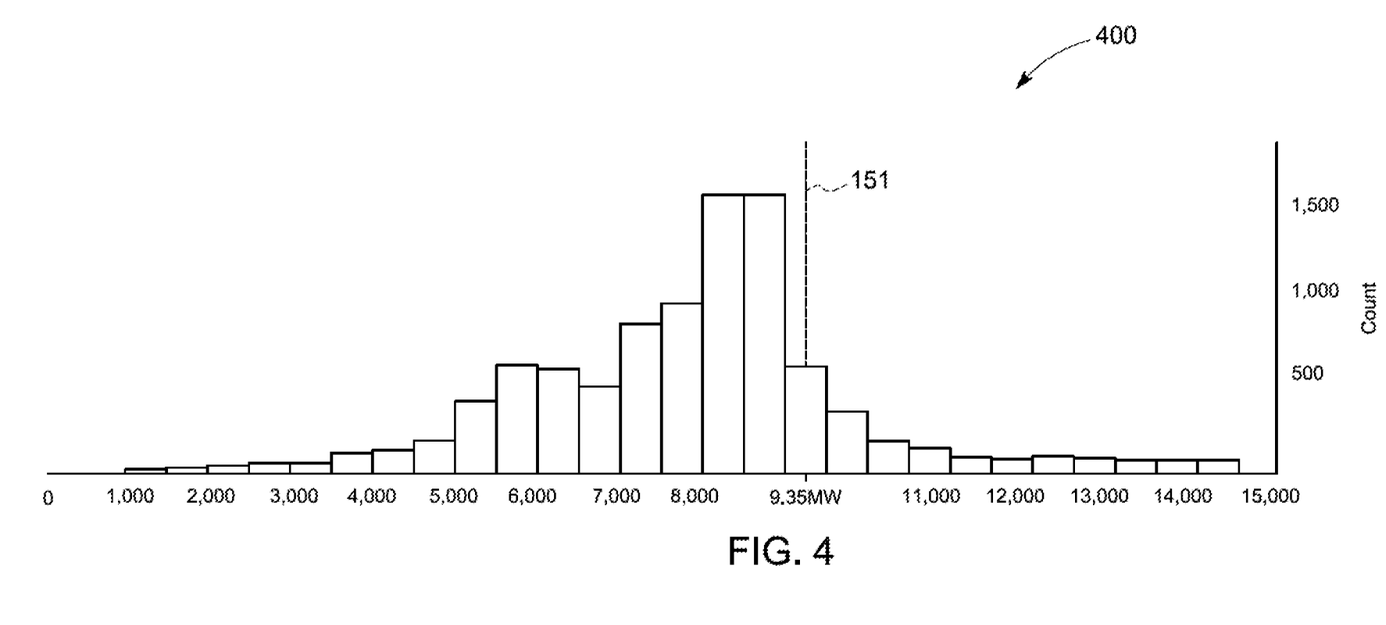
FIG. 4 illustrates a histogram representing an hourly power gap of FIG. 1B that is satisfied by the TPG system in combination with a supplemental, energy storage system, in accordance with an embodiment of the present invention.

With reference now to FIG. 4, the figure shows a histogram 400 representing an new hourly power gap distribution (the original power gap 101 was identified in the example shown in FIGS. 1A and 1n associated histogram 150 of FIG. 1B) that one or more gas engines/turbines would have to make up over a 12-month (equivalent to 8760-hour) time period when the gas engines/turbines are assisted by energy storage device (e.g., BESS) 217a, 217b, as shown in one example aspect of the present disclosure. Similar to the histogram 150 shown in FIG. 1B, the vertical dotted line 151 represents the maximum output power (9.35 MW) that the example single gas engine can deliver. Thus, the bars to the right of the dotted line represent the amount of hours in which two gas engines (with the added power support of a BESS 217) are used to deliver the necessary power to make up for the power gap illustrated in FIG. 1A over the 1-year period. In this example, approximately 672 hours (or 7.7%) out of the year had a power gap of greater than 9.35 MW and thus required the operation of two gas engines. This should be contrasted with the histogram of FIG. 1B, which showed two gas engines being required to operate 24% out of the year when no BESS was available. In addition, the new histogram 400 shows a smaller fluctuation of power outputs delivered by the gas engine over the year period when compared to the histogram 150, with a larger percentage of operation hours between 8 MW and 9 MW. This is indicative of a greater efficiency in the operation of the gas engines, when considering that the example gas engine operates at maximum efficiency when running at maximum power. Such efficiency with the assistance of the BESS 217a, 217b and controller 230 translates into greater cost savings in energy production. Moreover, the lesser fluctuations in the output power setpoints of the example gas engine(s) with the help of the BESS 217 and controller 230 results in lesser wear and tear of the engine(s), which leads to less repair costs and longer engine lifespans.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors 233 (FIG. 2). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A hybrid power controller system comprising:
a memory for storing program instructions; and
a power controller processor, the power controller processor is coupled to the memory and the power controller processor is in communication with at least one renewable power generation system, at least one thermal power generation system, at least one energy storage device, and at least one power load, the power controller processor is operative to execute program instructions to:
determine a time window having at least one calculation cycle;
determine whether a net demand for dispatchable power for a first calculation cycle exceeds an output power setpoint for the at least one thermal power generation system for each calculation cycle of the time window;
determine, responsive to determining that the net demand for dispatchable power for the first calculation cycle exceeds the output power setpoint for the at least one thermal generation system for the first calculation cycle, whether a discharge power of at least one energy storage device satisfies a power gap, the power gap is a difference between the net demand for dispatchable power for the first calculation cycle and the output power setpoint for the at least one thermal generation system for the first calculation cycle and wherein the net demand is larger than the output power setpoint;
determine, responsive to determining that the discharge power satisfies the power gap, whether the discharge power is larger than a power rating of the at least one energy storage device;

generate, responsive to determining that the discharge power is not larger than the power rating, a discharge command and discharge the at least one energy storage device at the discharge power using the discharge command;

determine whether the discharge of the at least one energy storage device satisfies the power gap;

increase, responsive to determining that the discharge of the at least one energy storage device fails to satisfy the power gap, the output power setpoint for the at least one thermal generation system for the first calculation cycle to satisfy the power gap;

determine, responsive to determining that the net demand for dispatchable power for the first calculation cycle does not exceed the output power setpoint for the at least one thermal generation system for the first calculation cycle, whether a charge power of at least one energy storage device satisfies a power surplus, the power surplus is a difference between the net demand for dispatchable power for the first calculation cycle and the output power setpoint for the at least one thermal generation system for the first calculation cycle and wherein the output power setpoint is larger than the net demand;

determine, responsive to determining that the charge power satisfies the power surplus, whether the charge power is larger than the power rating of the at least one energy storage device;

generate, responsive to determining that the charge power is not larger than the power rating, a charge command and charge the at least one energy storage device at the charge power using the charge command;

determine whether the charge of the at least one energy storage device satisfies the power surplus;

decrease, responsive to determining that the charge of the at least one energy storage device fails to satisfy the power surplus, the output power setpoint for the at least one thermal generation system for the first calculation cycle; and control a gas engine of the at least one thermal generation system to adjust an output power level of the at least one thermal generation system based on the decreased output power setpoint.

2. The hybrid power controller system of claim 1, further comprising program instructions to:
calculate the output power setpoint for the at least one thermal generation system for a first calculation cycle of the time window;
calculate an available renewable power generation for the first calculation cycle;
calculate a required load demand from the at least one power load for the first calculation cycle; and
calculate a net demand for dispatchable power for the first calculation cycle based on the calculated available renewable power generation and the calculated required load demand.

3. The hybrid power controller system of claim 2, wherein the calculate an output power setpoint for the at least one thermal generation system for a first calculation cycle of the time window further comprising program instructions to:
calculate a total energy generation required from the at least one thermal generation system for the time window; and
divide the total energy generation required by a total number of calculation cycles of the time window.

4. The hybrid power controller system of claim 3, wherein the calculate the total energy generation required from the at least one thermal generation system for the time window further comprising program instructions to:
acquire a load demand from the at least one power load for the time window;
calculate a total available energy generation for the time window from the at least one renewable power generation system; and
calculate a difference between the load demand for the time window and the total available energy generation for the time window.

5. The hybrid power controller system of claim 1, further comprising program instructions to: maintain, responsive to determining that the discharge of the at least one energy storage device at the discharge power satisfies the power gap, the output power setpoint for the at least one thermal generation system for the first calculation cycle.

6. The hybrid power controller system of claim 1, further comprising program instructions to: maintain, responsive to determining that the charge of the at least one energy storage device at the charge power satisfies the power surplus, the output power setpoint for the at least one thermal generation system for the first calculation cycle.

7. The hybrid power controller system of claim 1, further comprising program instructions to:
cap, responsive to determining that the discharge power does not satisfy the power gap, discharge of the at least one energy storage device at remaining discharge power amount; and
determine whether the discharge power is larger than the power rating of the at least one energy storage device.

8. The hybrid power controller system of claim 1, further comprising program instructions to:
cap, responsive to determining that the charge power does not satisfy the power surplus, charge of the at least one energy storage device at remaining charge power amount; and
determine whether the charge power is larger than the power rating of the at least one energy storage device.

9. The hybrid power controller system of claim 1, further comprising program instructions to:
cap, responsive to determining that the discharge power is larger than the power rating, discharge of the at least one energy storage device at power rating of the at least one energy storage device;
generate a discharge command to discharge the at least one energy storage device at the power rating of the at least one energy storage device; and
determine whether the discharge of the at least one energy storage device satisfies the power gap.

10. The hybrid power controller system of claim 1, further comprising program instructions to:
cap, responsive to determining that the charge power is larger than the power rating, charge of the at least one energy storage device at power rating of the at least one energy storage device;
generate a charge command to charge the at least one energy storage device at the power rating of the at least one energy storage device; and
determine whether the charge of the at least one energy storage device satisfies the power surplus.

11. A method comprising:
determining a time window having at least one calculation cycle;
determining whether a net demand for dispatchable power for a first calculation cycle exceeds an output power setpoint for at least one thermal power generation system for each calculation cycle of the time window;

determining, responsive to determining that the net demand for dispatchable power for the first calculation cycle exceeds the output power setpoint for the at least one thermal generation system for the first calculation cycle, whether a discharge power of at least one energy storage device satisfies a power gap, the power gap is a difference between the net demand for dispatchable power for the first calculation cycle and the output power setpoint for the at least one thermal generation system for the first calculation cycle and wherein the net demand is larger than the output power setpoint;

determining, responsive to determining that the discharge power satisfies the power gap, whether the discharge power is larger than a power rating of the at least one energy storage device;

generating, responsive to determining that the discharge power is not larger than the power rating, a discharge command and discharging the at least one energy storage device at the discharge power using the discharge command;

determining whether the discharge of the at least one energy storage device satisfies the power gap;

increasing, responsive to determining that the discharge of the at least one energy storage device fails to satisfy the power gap, the output power setpoint for the at least one thermal generation system for the first calculation cycle to satisfy the power gap;

determining, responsive to determining that the net demand for dispatchable power for the first calculation cycle does not exceed the output power setpoint for the at least one thermal generation system for the first calculation cycle, whether a charge power of at least one energy storage device satisfies a power surplus, the power surplus is a difference between the net demand for dispatchable power for the first calculation cycle and the output power setpoint for the at least one thermal generation system for the first calculation cycle and wherein the output power setpoint is larger than the net demand;

determining, responsive to determining that the charge power satisfies the power surplus, whether the charge power is larger than the power rating of the at least one energy storage device;

generating, responsive to determining that the charge power is not larger than the power rating, a charge command and charging the at least one energy storage device at the charge power using the charge command;

determining whether the charge of the at least one energy storage device satisfies the power surplus;

decreasing, responsive to determining that the charge of the at least one energy storage device fails to satisfy the power surplus, the output power setpoint for the at least one thermal generation system for the first calculation cycle; and controlling a gas engine the at least one thermal generation system to adjust an output power level of the at least one thermal generation system based on the decreased output power setpoint.

12. The method of claim 11, further comprising:
calculating the output power setpoint for the at least one thermal generation system for a first calculation cycle of the time window;
calculating an available renewable power generation for the first calculation cycle;
calculating a required load demand from the at least one power load for the first calculation cycle; and
calculating a net demand for dispatchable power for the first calculation cycle based on the calculated available renewable power generation and the calculated required load demand.

13. The method of claim 12, wherein the calculating an output power setpoint for the at least one thermal generation system for a first calculation cycle of the time window further comprising:
calculating a total energy generation required from the at least one thermal generation system for the time window; and
dividing the total energy generation required by a total number of calculation cycles of the time window.

14. The method of claim 13, wherein the calculating the total energy generation required from the at least one thermal generation system for the time window further comprising:
acquiring a load demand from the at least one power load for the time window;
calculating a total available energy generation for the time window from at least one renewable power generation system; and
calculating a difference between the load demand for the time window and the total available energy generation for the time window.

15. The method of claim 11, further comprising:
maintaining, responsive to determining that the discharge of the at least one energy storage device at the discharge power satisfies the power gap, the output power setpoint for the at least one thermal generation system for the first calculation cycle.

16. The method of claim 11, further comprising:
maintaining, responsive to determining that the charge of the at least one energy storage device at the charge power satisfies the power surplus, the output power setpoint for the at least one thermal generation system for the first calculation cycle.

17. The method of claim 11, further comprising:
capping, responsive to determining that the discharge power does not satisfy the power gap, discharge of the at least one energy storage device at remaining discharge power amount; and
determining whether the discharge power is larger than the power rating of the at least one energy storage device.

18. The method of claim 11, further comprising:
capping, responsive to determining that the charge power does not satisfy the power surplus, charge of the at least one energy storage device at remaining charge power amount; and
determining whether the charge power is larger than the power rating of the at least one energy storage device.

19. A non-transitory computer-readable medium storing instructions that, when executed by a computer processor, cause the computer processor to perform a method comprising:
determining a time window having at least one calculation cycle;
determining whether a net demand for dispatchable power for a first calculation cycle exceeds an output power setpoint for at least one thermal power generation system for each calculation cycle of the time window;
determining, responsive to determining that the net demand for dispatchable power for the first calculation cycle exceeds the output power setpoint for the at least one thermal generation system for the first calculation cycle, whether a discharge power of at least one energy storage device satisfies a power gap, the power gap is a difference between the net demand for dispatchable power for the first calculation cycle and the output power setpoint for the at least one thermal generation system for the first calculation cycle and wherein the net demand is larger than the output power setpoint;

determining, responsive to determining that the discharge power satisfies the power gap, whether the discharge power is larger than a power rating of the at least one energy storage device;

generating, responsive to determining that the discharge power is not larger than the power rating, a discharge command and discharge the at least one energy storage device at the discharge power using the discharge command;

determining whether the discharge of the at least one energy storage device satisfies the power gap;

increasing, responsive to determining that the discharge of the at least one energy storage device fails to satisfy the power gap, the output power setpoint for the at least one thermal generation system for the first calculation cycle to satisfy the power gap;

determining, responsive to determining that the net demand for dispatchable power for the first calculation cycle does not exceed the output power setpoint for the at least one thermal generation system for the first calculation cycle, whether a charge power of at least one energy storage device satisfies a power surplus, the power surplus is a difference between the net demand for dispatchable power for the first calculation cycle and the output power setpoint for the at least one thermal generation system for the first calculation cycle and wherein the output power setpoint is larger than the net demand;

determining, responsive to determining that the charge power satisfies the power surplus, whether the charge power is larger than the power rating of the at least one energy storage device;

generating, responsive to determining that the charge power is not larger than the power rating, a charge command and charge the at least one energy storage device at the charge power using the charge command;

determining whether the charge of the at least one energy storage device satisfies the power surplus;

decreasing, responsive to determining that the charge of the at least one energy storage device fails to satisfy the power surplus, the output power setpoint for the at least one thermal generation system for the first calculation cycle; and controlling a gas engine the at least one thermal generation system to adjust an output power level of the at least one thermal generation system based on the decreased output power setpoint.

20. The medium of claim 19, further comprising instructions to perform a method comprising:
calculating the output power setpoint for the at least one thermal generation system for a first calculation cycle of the time window;
calculating an available renewable power generation for the first calculation cycle;
calculating a required load demand from the at least one power load for the first calculation cycle; and
calculating a net demand for dispatchable power for the first calculation cycle based on the calculated available renewable power generation and the calculated required load demand.

\* \* \* \* \*